Patented Feb. 14, 1933                                                                              1,897,183

UNITED STATES PATENT OFFICE

HAROLD E. WHITE, OF ZELIENOPLE, PENNSYLVANIA, ASSIGNOR TO LAVA CRUCIBLE COMPANY OF PITTSBURGH, OF PITTSBURGH, PENNSYLVANIA, A CORPORATION OF PENNSYLVANIA

METHOD OF AND MATERIAL EMPLOYED IN THE MANUFACTURE OF REFRACTORY ARTICLES

No Drawing.    Application filed January 30, 1930.    Serial No. 424,737.

This invention relates to the method of and material employed in the manufacture of refractory articles, such as bricks, blocks, furnace linings, and crucibles or melting pots for metals, glass, and similar substances.

Among the objects of the present invention are, to provide a new and improved material or composition of matter employed in the manufacture of refractory articles; a method of making a refractory article; a new and improved method of producing said material; a material having the qualities of resistance to slag attack, resistance to spalling, and a material of such character as to control the shrinkage of the articles being manufactured.

In the manufacture of the types of refractories contemplated by the present invention, it has heretofore been the practice to select raw materials for their refractoriness, and for their adaptability for manufacturing into refractory shapes. As a consequence, in nearly all of the common fireclays now in use, silica predominates over alumina, as the majority of the commercial clays are of this composition.

This material is not especially harmful, provided the refractory articles are well made and are used at least 200 degrees F. below their melting point, and, further, when they are not subjected to slag attack. It is well known that at high temperatures, silica reacts as a strong acid and alumina generally as a base, the latter always re-acting as such when associated with appreciable amounts of silica. Therefore, considerable trouble has heretofore been encountered when the refractory articles have been employed in high temperatures and in cases where they are subjected to slag attack.

The present invention contemplates the production of articles or shapes that may be employed under the conditions stated, with better results.

In the preparation of my improved material, I preferably mix in suitable proportions and in a dry state, commercial crystalline alumina and crystalline mullite, or mullite bearing materials, together with a bonding clay, preferably a high alumina bonding clay. Both the crystalline mullite or its equivalent and the crystalline alumina are obtainable in grain form, and I prefer to employ crystalline mullite having finer grains than the grains of the crystalline alumina.

Proportions of the mixture may be fifty to sixty percent of crystalline alumina, thirty to forty percent of mullite in the form of converted sillimanite, cyanite, andalusite, or else the electric furnace product, and ten percent high alumina bonding clay. It is preferable that the mullite or the mullite bearing material be of the 63-37 ratio, i. e., sixty-three parts of alumina and thirty-seven parts of silica.

I have discovered that utilization of finer particles of mullite crystals surrounding the large particles of crystalline alumina tend to foster the growth of interlocking mullite crystals between the alumina particles and the surrounding bond, or between the alumina particles themselves. The crystalline alumina, which is used as one of the ingredients of this mixture, must be properly selected for its crystallization. It must be of the alpha variety, and well crystallized, containing a maximum amount of corundum crystals and a minimum amount of glass, especially glass containing appreciable quantities of titania and silica. Small quantities of iron oxide are allowable.

The crystalline mullite similarly should be free from the glass above mentioned, and should also be free from the phenomena of wet crystals.

It is preferable to have the accompanying glass in a mullite bearing mineral high in alumina and free from all other impurities, except silica. By mullite and mullite bearing minerals is meant minerals of the sillimanite, cyanite and andalusite group, which have been freed of all foreign matter by washing and crushing methods, and then have been converted, so that the largest proportion of their crystal structure has been changed to the true mullite crystal.

The bonding clay employed is preferably one containing a larger proportion of alumina than silica, and also free from accompanying oxide impurities. It should be selected more for its chemical than physical characteristics, as it acts more to fill voids and to hold the article during its manufacture, than it does as a true bond.

These ingredients are thoroughly mixed in a dry state and then moistened and mixed in the plastic state. The raw batch is properly aged and then formed into refractory shapes, as desired, by the manufacturer. This may be done either by pressing, casting, or other means of molding. These shapes are then dried and fired. The firing must be of a sufficient duration and of sufficient temperature to allow for a secondary crystallization of mullite to take place. A temperature of 3000 degrees F., continued for 90 to 150 hours, is desirable. This fire, of course, must be preceded by sufficient pre-heating period and followed by proper cooling period.

The resulting product exhibits a predominance of corundum crystals surrounded by an interlocking growth of small mullite crystals, bonding larger mullite particles and alumina particles together, as well as bonding the alumina particles themselves together; in other words, the bond acts from alumina particle to alumina particle, and also from alumina particle to mullite particle, and then to alumina particle. This crystallizazation gives maximum strength and also maximum resistance to slagging and slag penetration.

It is inadvisable to use anything but crystalline alumina and crystalline mullite, as, were the amorphous variety of either of these materials to be used, the shrinking of the article would tend to disrupt this interlocking crystal growth, and the desired properties could not be obtained.

The presence of impurities, such as calcium oxide, titania, and similar impurities, inhibits the growth of the mullite crystal. Contrarily, the presence of small percentages of alkali increases the mullite growth; however, they also tend to lower the refractories of the body.

I claim:

1. A material for making a refractory article comprising crystalline alumina in grain form and of high crystallization, crystalline mullite in grain form and having finer grains than the crystalline alumina, and a high alumina bonding clay.

2. A material for making a refractory article comprising crystalline alumina, crystalline mullite, and a bonding clay, the proportion of crystalline alumina being in excess of the mullite and the crystalline alumina and the crystalline mullite constituting the major portion of the material.

3. A material for making a refractory article comprising substantially fifty to sixty percent crystalline alumina, substantially thirty to forty percent crystalline mullite having substantially the proportion of sixty-three parts of alumina and thirty-seven parts of silica, and a high alumina bonding clay.

4. A raw batch for making a refractory article comprising uncombined crystalline alumina, crystalline mullite, and a bonding clay, the crystalline alumina and the mullite being in such conditions and proportions that upon being fired to a high temperature for a prolonged period a portion of the crystalline alumina and a portion of the crystalline mullite will re-act and produce a secondary crystallization of the mullite whereby the alumina crystals and mullite crystals will interlock to produce a refractory article of high strength and resistance to slag attack.

5. The method of making a refractory article which includes mixing crystalline alumina, crystalline mullite, and a bonding clay, the proportion of the crystalline alumina being in excess of the crystalline mullite, forming the mixture into a shape, and then subjecting the shape for a sufficient period of time to a temperature to produce a secondary crystallization of the mullite.

In testimony whereof I affix my signature.

HAROLD E. WHITE.